(12) United States Patent
Kaemmerer (10) Patent No.: US 6,298,323 B1
(45) Date of Patent: *Oct. 2, 2001

(54) COMPUTER VOICE RECOGNITION METHOD VERIFYING SPEAKER IDENTITY USING SPEAKER AND NON-SPEAKER DATA

(75) Inventor: Bernhard Kaemmerer, Ottobrunn (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/900,699

(22) Filed: Jul. 25, 1997

(30) Foreign Application Priority Data

Jul. 25, 1996 (DE) .............................. 196 30 109

(51) Int. Cl.$^7$ .................................................. G10L 17/00
(52) U.S. Cl. ............................................ 704/246; 704/232
(58) Field of Search .................................... 704/246, 247, 704/250, 249, 248, 232, 202, 273; 706/20

(56) References Cited

U.S. PATENT DOCUMENTS

| | | | | |
|---|---|---|---|---|
| 3,700,815 | * | 10/1972 | Doddington et al. | 704/246 |
| 4,581,755 | * | 4/1986 | Sakoe | 704/247 |
| 4,716,593 | * | 12/1987 | Hirai et al. | 704/247 |
| 4,720,863 | | 1/1988 | Li et al. | |
| 4,752,958 | * | 6/1988 | Cavazza et al. | 704/246 |
| 5,339,385 | * | 8/1994 | Higgins | 704/246 |
| 5,430,827 | * | 7/1995 | Rissanen | 704/246 |
| 5,649,068 | * | 7/1997 | Boser et al. | 706/12 |
| 5,675,704 | * | 10/1997 | Juang et al. | 704/246 |

FOREIGN PATENT DOCUMENTS

| | | |
|---|---|---|
| 42 40 978 A1 | 6/1994 | (DE) . |
| WO 86/05618 | 9/1986 | (WO) . |
| WO 96/17341 | 6/1996 | (WO) . |

OTHER PUBLICATIONS

Farrell et al "Speaker Recognition Using Neural Networks and Conventional Classifiers" 1/94, IEEE vol. 2, pp. 194–205.*
Naik "Speaker Verification: A Tutorial" IEEE Communications pp. 42–48, Jan. 1990.*
Nelson "A Practical Guide to Neural Nets" Addison Wesly pp. 67 and 68, 1991.*
Deller et al, "Discrete–time processing of speech signals" Prentice–Hall, 83, 837–839, 1987.*
Deller et al "Discrete–time processing of speech signals" Prentice Hall pp. 841–845.*

(List continued on next page.)

*Primary Examiner*—William Korzuch
*Assistant Examiner*—Angela Armstrong
(74) *Attorney, Agent, or Firm*—Schiff Hardin & Waite (57) ABSTRACT

A method for recognizing a speaker in which a voice signal is spoken into a computer by a speaker and a feature vector is formed for the voice signal. The feature vector is compared to at least one stored reference feature vector and to at least one anti-feature vector. The reference feature vector is formed from a speech sample of a speaker to be verified. The anti-feature vector was formed from a speech sample that was spoken in by another speaker who is not the speaker to be verified. A 2-class classification is resolved by forming a similarity value and evaluating the similarity value on the basis of a predetermined range within which the similarity value must deviate from a predetermined value so that the voice signal can be classified as deriving from the speaker to be verified.

13 Claims, 3 Drawing Sheets

OTHER PUBLICATIONS

Deller "Discrete-time processing of speech signals" Prentice Hall p. 621, 1987.*

S. Furui, Cepstral Analysis Technique for Automatic, Speaker Verification, IEEE Transactions ASSP, vol. ASSP-29, Nr. 2, S. 254–272, Apr. 1981.

B. Kammerer, et al., Experiments for Isolated Word Recognition, Single- and Two-Layer-Perceptrons, Neural Networks, vol. 3, S. 693–706, 1990.

J.M. Naik, et al., A Hybrid HMM–MLP Speaker Verification Algorithm for Telephone Speech, IEEE, Apr. 19, 1994, pp. I-153–156.

M. Forsyth, Discriminating observation probability (DOP) HMM for speaker veritification, Speech Communication Board. 17, Nr. 1/2, Aug. 1995, pp. 117–129.

\* cited by examiner

COMPUTER VOICE RECOGNITION METHOD VERIFYING SPEAKER IDENTITY USING SPEAKER AND NON-SPEAKER DATA

BACKGROUND OF THE INVENTION

The present invention relates generally to methods and apparatus for verifying speakers such as voice recognition systems.

Methods for verifying speakers (hereafter also "speaker verification") generally use person-specific properties of the human voice as biometric features. The identity check of a person becomes possible with them on the basis of a brief voice (or: speech) sample of the person. In such methods, speaker-specific features are usually extracted from at least one digital voice (or: speech) sample. Acoustic features that reflect the person-specific dimensions of the vocal tract and the typical time sequence of the articulation motions are particularly suitable as such features.

In speech recognition methods, there generally are two different phases, a training phase and a test phase.

In a training phase, expressions prescribable by a user are spoken into an arrangement that implements the method for speaker verification in what are referred to as text-dependent speaker verification methods. Reference feature vectors that contain speaker-specific features extracted from the digital reference voice (or: speech) sample are formed for these reference voice (or: speech) samples. For determining the individual reference feature vectors or, respectively, feature vectors from the voice (or: speech) signals, the respective voice (or: speech) signal is usually divided into small pseudo-stationary sections, which are referred to as frames. The voice (or: speech) signal is assumed to be stationary for the pseudo-stationary sections. The pseudo-stationary sections typically exhibit a time length of about 10 to 20 ms.

In the test phase, at least one feature vector, and usually a plurality of feature vectors, are formed for a spoken voice (or: speech) signal, this or these being compared to at least one reference feature vector from that formed from a recent voice (or: speech) sample, i.e., the voice (or: speech) sample just spoken by the person to be verified. Given an adequately small difference, i.e. given great similarity between the feature vector and the reference feature vector, the speaker is accepted as the speaker to be verified. The tolerance range for the decision as to when a speaker is to be accepted or, respectively, rejected as the speaker to be verified is usually determined in the training phase. However, this range is also freely prescribable during the test phase depending on the required security demands to made of the verification method.

The above-described method wherein a decision as to whether the speaker is accepted as the speaker to be verified is made on the basis of a comparison of the at least one feature vector to the reference feature vector is known from the document: S. Furui, Cepstral Analysis Technique for Automatic Speaker Verification, IEEE Transactions ASSP, Vol. ASSP-29, No. 2, pp. 254–272, April 1981, fully incorporated herein by reference.

A considerable disadvantage of the method described by S. Furui is that the method exhibits considerable uncertainty in the verification of the speaker. The uncertainty results in that a decision threshold for the acceptance or rejection of the speaker must be defined. The definition of the decision threshold ensues only on the basis of voice (or: speech) samples of the user to be verified.

A method for the pre-processing of spoken voice (or: speech) signals in the voice processing as well as basics about feature extraction and feature selection, i.e. basics about the formation of feature vectors for the voice signals, is also known, for example from the document: G. Ruske, Automatische Spracherkennung, Methoden der Klassifikation und Merkmalsextraction, Oldenbourg-Verlag, ISBN 3-486-20877-2, pp. 11–22 and pp. 69–105, 1988, fully incorporated herein by reference.

In addition, B. Kammerer and W. Kupper, Experiments for Isolated Word Recognition, Single-and Two-Layer-Perceptrons, Neural Networks, Vol. 3, pp. 693–706, 1990, full incorporated herein by reference, discloses that a plurality of voice (or: speech) samples be derived from the voice (or: speech) sample by time distortion from a reference voice (or: speech) sample for the formation of a plurality of reference feature vectors in speaker recognition.

SUMMARY OF THE INVENTION

The present invention concerns a method for speaker verification that enables a more dependable speaker verification than the method described by, e.g., S. Furui.

In an embodiment, the invention provides a method for recognizing a speaker with a computer on the basis of at least one voice signal spoken by a speaker comprising the steps of:

a) forming at least one feature vector for the voice signal, b) comparing the feature vector to at least one reference feature vector that was formed from at least one voice signal of a speaker to be verified, c) comparing the feature vector to at least one anti-feature vector that was formed from at least one voice signal of another speaker who is not the speaker to be verified, d) forming a similarity value from the comparisons, a similarity of the feature vector to the reference feature vector and a similarity of the feature vector with the anti-feature vector being described by said similarity value, and e) classifying the speaker as the speaker to be verified when the similarity value deviates within a prescribed range from a prescribed value.

In such a method at least one feature vector is formed for a voice (or: speech) signal spoken by a speaker. On the one hand, the feature vector is compared to at least one reference feature vector that was formed from a voice (or: speech) sample spoken previously by the speaker to be verified. Further, the feature vector is compared to at least one anti-feature vector that was formed from a voice (or: speech) sample spoken by a speaker not to be verified. Herein, the term "anti-feature vector" is meant to convey that such a vector is formed from the voice (or: speech) of someone not the speaker to be verified so that such a vector has features recognizable as different from those of the speaker to be verified. A similarity value is determined from the comparisons of the feature vector to the reference feature vector and to the anti-feature vector, and the speaker is classified or not classified as the speaker to be verified dependent on the similarity value.

A considerably more exact, simpler and, thus, faster speaker verification is achieved by considering at least one "anti-example" for the reference feature vector that was spoken by the speaker to be verified. This results in that it is not only the similarity of the spoken voice (or: speech) signal to a voice (or: speech) sample previously spoken by the speaker to be verified that is compared. The spoken voice (or: speech) signal is also compared to voice (or: speech) samples that derive from other speakers who are not the speaker to be verified. What is referred to as a 2 class classification problem results, this leading to enhanced precision and, thus, dependability of the verification result.

In an embodiment, the invention provides a method for recognizing a speaker with a computer on the basis of at least one voice signal spoken by a speaker comprising the steps of:

a) forming at least one feature vector for the voice signal,
b) comparing the feature vector to at least one reference feature vector that was formed from at least one voice signal of a speaker to be verified,
c) comparing the feature vector to at least one anti-feature vector that was formed from at least one voice signal of another speaker who is not the speaker to be verified,
d) reiterating steps a) through c) for a spoken sequence of voice signals,
e) forming an overall similarity value by means of an overall comparison of at least a part of the sequence of voice signals to the corresponding feature vectors ad the corresponding anti-feature vectors, and
e) classifying the speaker as the speaker to be verified when the overall similarity value deviates within a prescribed range from a prescribed value.

In such a method the previously described method comprising the features of forming the feature vector and the comparisons of the feature vector to the reference feature vector as well as the anti-reference feature vector is respectively implemented for a plurality of voice (or: speech) signals. In this method, a similarity value is not formed for a voice (or: speech) signal; rather, an overall similarity value is formed by an overall comparison of at least a part of the sequence of voice (or: speech) signals to the corresponding reference feature vectors and anti-feature vectors, and the verification decision is based on the overall similarity value that is determined.

With this method it is also possible to process an entire sequence of prescribable voice (or: speech) signals, for example, pseudo-randomly or randomly interrogated from the speaker by the arrangement that implements the method. A verification method that is very dependable since its complexity has been heightened thus becomes possible without having to substantially increase the outlay for the realization and implementation of the method with a computer.

It is advantageous for improving the verification result to make the decision not only on the basis of the overall similarity value but to respectively form a similarity value in each iteration step, i.e. for each voice (or: speech) signal, and to only continue the method with further voice (or: speech) signals when the similarity value deviates by a prescribable value from a prescribable range, i.e. when each individual voice (or: speech) signal is similar enough to the reference voice signal. When it is not, the speaker is classified as not being the speaker to be verified.

It is also advantageous to realize the respective method with a neural network, as a result whereof an extremely simple realization of the method and, thus, a very fast implementation of the method with a computer becomes possible.

A further acceleration of the implementation of the method is achieved by what is referred to as a perceptron structure of the neural network.

Since it is also provided that a plurality of reference voice (or: speech) samples as well as anti-feature voice (or: speech) samples and, thus, of reference feature vectors and anti-feature vectors are taken into consideration in the method, it is necessary in this case to have the respective speakers speak a plurality of voice (or: speech) samples and to store them. This leads to an increased, additional outlay that is very unpleasant for a user. The added outlay in the method is considerably reduced by a development wherein only one voice (or: speech) sample of the speaker to be verified and/or of the further speaker, who is not the speaker to be verified, is recorded and processed. Further voice (or: speech) samples for the respective voice (or: speech) sample are derived by time distortions of the respective voice (or: speech) sample; this can likewise be used as reference voice (or: speech) samples or, respectively, voice (or: speech) anti-samples and, thus, as reference feature vectors and anti-feature vectors.

A further simplification of the method and a considerable saving of memory requirement in the computer implementing the method is achieved with a development of the method wherein the voice (or: speech) signal employed respectively represents an individual letter and/or an individually spoken number.

The method can be advantageously utilized for owner or, respectively, user verification in telecommunication terminal equipment or, respectively, in mobile radiotelephone terminal equipment.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

Figure 1:
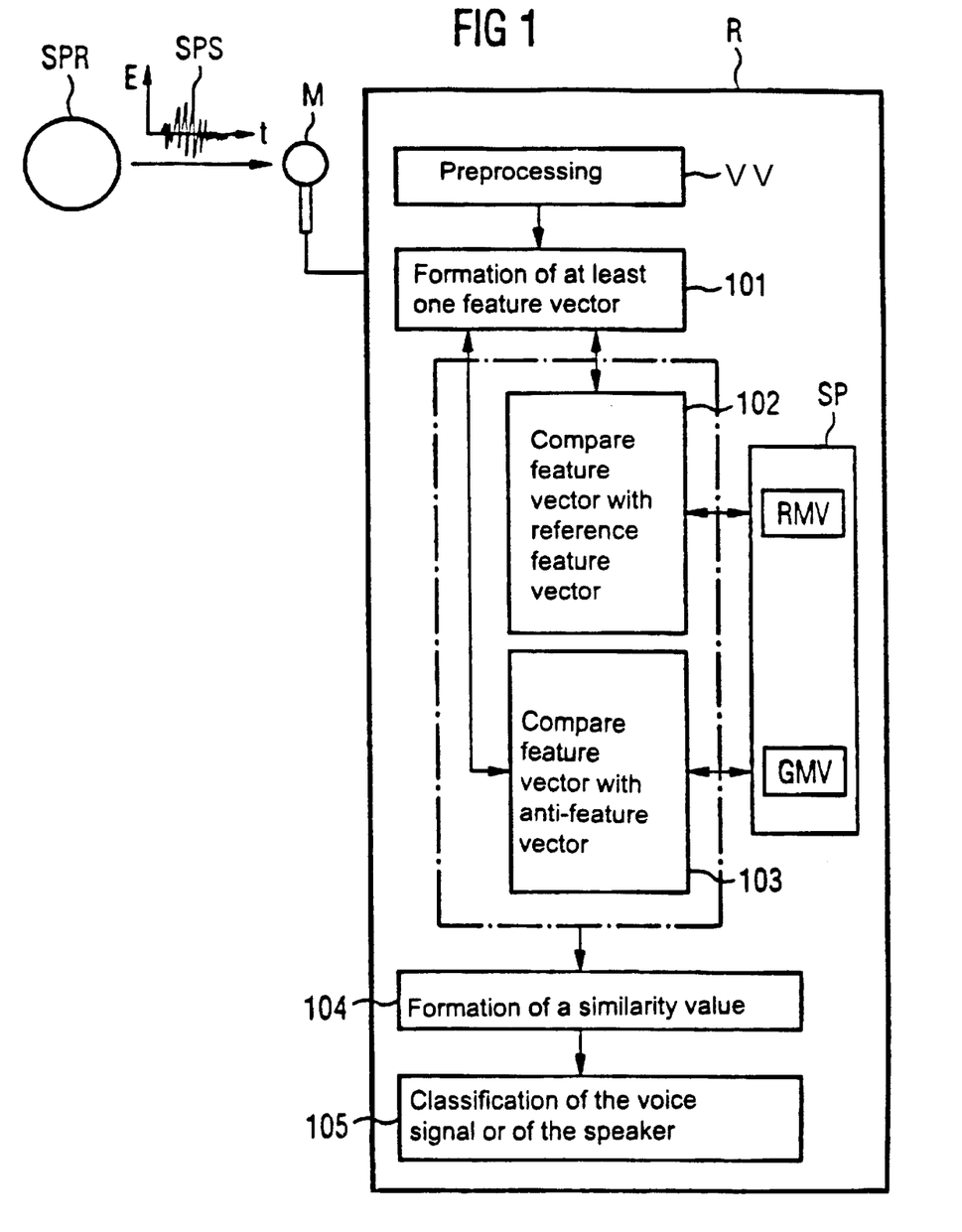
FIG. 1 illustrates the speaking of a voice (or: speech) signal and the processing thereof in a computer with a method for speaker verification for a voice (or: speech) signal.

In the form of a block diagram, FIG. 1 shows a speaker SPR who speaks an arbitrary voice (or: speech) signal SPS into a computer R, for example via an arbitrary microphone M coupled to the computer R.

The voice (or: speech) signal SPS is supplied to the computer R and optionally subjected to a pre-processing VV wherein, for example, the voice (or: speech) signal SPS is divided into individual so-called frames, and the individual frames are subjected, for example, to a fast Fourier transformation and/or to what is referred to as a ceptral smoothing and/or to noise compensation. Further, a word boundary detection can be implemented in the pre-processing VV, for example on the basis of energy E of the voice signal SPS or some other adaptive features of the voice signal SPS or on the basis of what is referred to as a plausibility check. What is referred to as a quasi-linear segmenting can also be implemented in the pre-processing VV for the voice signal SPS. Of course, further steps can be implemented in the pre-processing VV without limitations to the method.

What is to be understood by the computer R in the framework of this method is any arrangement with whose assistance this method can be implemented, including, for example, an additional computer card as well, for example what is referred to as a PCMCIA card or a chip card. The term computer R is thus definitely not to be exclusively understood as a complete electronic data processing system with additional periphery; rather, any circuit arrangement with which this method can be implemented is referred to as computer R in the scope of this document.

Preceding the actual method, voice (or: speech) samples that are employed in the method are usually determined and processed as preparatory method steps, as explained below.

First, at least one voice (or: speech) sample in the form of at least one prescribable voice (or: speech) signal is spoken into the computer R by a speaker to be verified, this being referred to below as reference voice (or: speech) signal. After what is likewise an optional pre-processing of the reference voice (or: speech) signal, at least one reference feature vector RMV that is stored in a memory SP of the computer R is formed from the reference voice (or: speech) signal.

After an arbitrary plurality of reference voice (or: speech) signals are spoken and the corresponding reference feature vectors RMV are formed and stored in the memory SP, voice (or: speech) samples of at least one speaker, who is referred to below as speaker not to be verified, are spoken in. This at least one voice (or: speech) signal spoken by the speaker not to be verified is referred to below as voice (or: speech) anti-signal. The voice (or: speech) anti-signal is also optionally subjected to a preprocessing, and at least one anti-feature vector GMV is formed for the respective voice (or: speech) anti-signal. The anti-feature vector GMV is also stored in the memory SP.

The methods for extracting features and for forming feature vectors as well as for selecting known, for example, from G. Ruske, Automtische Spracherkennung, Methoden der Klassifikation und Merkmalsextraction, Oldenbourg-Verlag, ISBN 3-486-20877-2, pp. 11–22 and pp. 69–105, 1988 (incorporated herein by reference) are employed for the formation of the at least one reference feature vector RMV as well as of the at least one anti-feature vector GMV. This article as well is incorporated herein by reference.

Further methods for forming feature vectors can, however, be employed without limitations in the framework of this method.

The actual method is implemented in a test or operating phase after the end of what is refered to as the training phase, i.e. the processing of the at least one reference feature vector RMV as well as of the at least one anti-feature vector GMV.

After an optional pre-processing VV of a voice (or: speech) signal SPS to the voice (or: speech) signal SPS, at least one feature vector MV is thereby formed step or in module 101 for the voice (or: speech) signal SPS spoken by the speaker SPR. It should be noted that the selection of the methods for forming the respective vector MV, RMV, GMV is basically arbitrary but that the feature vectors MV, RMV, GMV should all be formed in the same way in order to meaningfully enable a comparison of the vector at all, as explained below.

It should also be noted that the steps or modules depicted in the Figures are referred to interchangeably as the modules might comprise computer implementation of steps via software, firm ware, etc., and, thus, in effect are indistinguishable.

After the formation step or in module 101 of the at least one feature vector MV, the feature vector MV is compared in step or module 102 to at least one reference feature vector RMV.

Further, the feature vector MV is compared in step or module 103 to the at least one anti-feature vector GMV.

The comparisons can be implemented using arbitrary methods for difference determination of feature vectors in what is referred to as the feature space that is known in voice (or: speech) processing.

When the voice signal (or: speech) SPS as well as the reference voice (or: speech) signal and the voice (or: speech) anti-signal are divided into what are referred to as frames, then respective vectors MV, RMV, GMV are formed for the frames and compared to one another. Arbitrary methods for considering clusters that arise, for example, due to a plurality of reference feature vectors RMV and/or a plurality of anti-feature vectors GMV in the framework of the method can also be employed in the framework of these comparisons. For example, what is referred to as the minimum distance classifier or what is referred to as the closest neighbor classifier or what is referred to as the Mahalanobis distance classifier are thereby known.

A similarity value AW is determined in step or module 104 from the comparisons in step or modules 102 and 103 of the feature vector MV to the reference feature vector RMV and the anti-feature vector GMV. This ensues, for example, with the results determined with the methods for difference determination of the feature vectors.

Further alternatives for the formation of the similarity value AW are explained in detail in the framework of developments of the method.

When the similarity value AW deviates at most from within a prescribable range by a prescribable value, then the speaker SPR is classified as the speaker ZVS to be verified and is thus verified in step or module 105.

When, however, the similarity value AW deviates from the prescribable value by more than the prescribable range, then the speaker SPR is not classified in step or module 105 as the speaker ZVS to be verified.

As can be appreciated, the voice signal SPS is an arbitrary voice signal that is limited by noise.

In order to improve the dependability of the method, the invention provides for the use of not only one voice signal SPS for the verification of the speaker SPR but a sequence of voice signals SPSi, whereby I indicates an index that unambiguously identifies every voice signal SPSi. The index I is an arbitrary number between 1 and n, whereby a plurality of voice signals SPSi taken into consideration is referenced with n.

Figure 2:
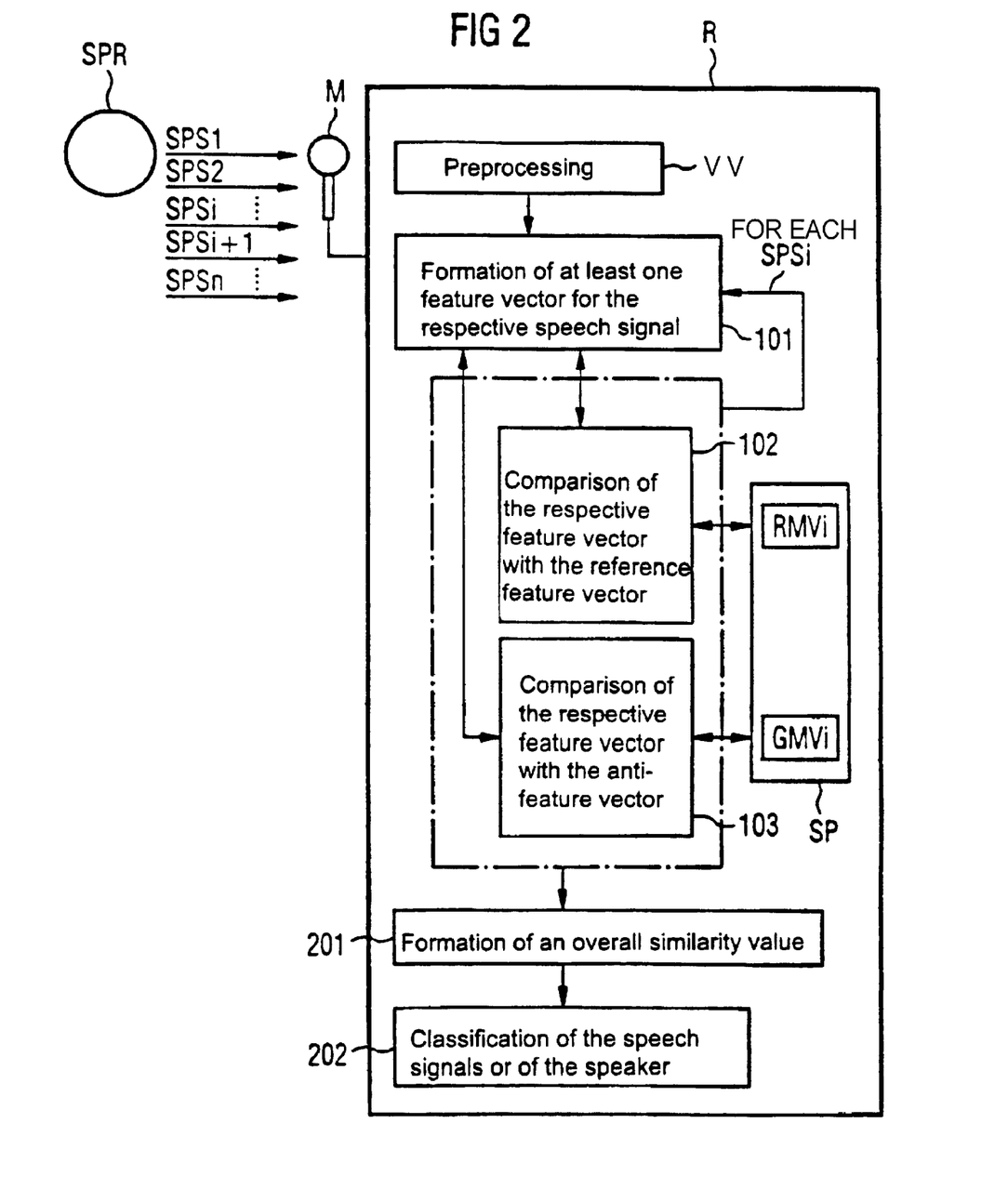
FIG. 2 illustrates the speaking of a plurality of voice signals and their processing in a computer according to a method for speaker verification upon employment of a sequence of spoken voice (or: speech) signals.

In that regard, with reference to FIG. 2, when a plurality of voice signals SPSi that are independent of one another are employed, the computer R, for example, potentially selects these and requests them from the speaker SPR as predetermined voice samples, i.e. interrogating them, then at least one feature vector MVi is respectively formed step or in module 101 for each voice signal SPSi. The at least one feature vector MVi is compared in steps or modules 102 and 103 to the at least one previously formed and stored reference feature vector RMVi belonging to the respective voice signal SPSi and to the at least one anti-feature vector GMVi.

In this method, the similarity value AW is not formed for every feature vector MVi; rather, an overall similarity value GAW is formed step or in module 201 for at least some of the spoken voice signals SPSi, and the speaker SPR is classified in step or module 202 as the speaker to be verified when the overall similarity value GAW deviates within a prescribable, second range from a prescribable, second value.

When the overall similarity value GAW deviates from the second value by more than the second range, then the speaker SPR is not classified in step or module 202 as the speaker to be verified.

The formation of the overall similarity value GAW likewise ensues, for example, upon employment of the above-described difference measurement methods in a feature space or in a way described below in the framework of further developments of the method.

It is provided in a development of the method to expand the method for a plurality of voice signals SPSi by a method step wherein a similarity value AW is determined for each voice signal SPSi in the same way as was described in the method for only one voice signal SPS. In this development, the next voice signal SPSi+1 is taken into consideration and examined when the respectively determined similarity value AW for the respective voice signal SPSi deviates from a prescribable third range by a prescribable third value. The dependability of the verification is enhanced with this procedure.

It is provided in a development of the method to not explicitly implement the comparisons but to determine the comparison information in the comparison steps or modules 102 and 103 in the framework of what is referred to as a discriminative method. In a training phase, the information material in the form of the at least one reference feature vector RMV and of the at least one anti-feature vector GMV is formed as a coefficient for the discriminative method for the testing phase and is stored.

In the actual method for speaker verification method, in what is referred to as the test phase, the feature vector MV is or the feature vectors MVi are merely supplied to the discriminative method, and the similarity value AW is or the overall similarity value GAW is detennined as a result.

The comparisons in steps or modules 102 and 103 of the at least one feature vector MV to the reference feature vector RMV or, respectively, to the anti-feature vector GMV ensue implicitly in the framework of the test phase of the discriminative method.

What is to be understood by a discriminative method is, for example, what is referred to as a polynomial classification that employs at least one neural network NN.

It is advantageous to realize the method using a neural network NN since the implementation of the method with the assistance of a computer R is considerably accelerated as a result.

The method is simplified further by a development employing the neural network NN with what is referred to as a perceptron structure, the method thus being capable of being implemented faster. An exemplary neural network NN with a perceptron structure is shown in FIG. 3.

Figure 3:
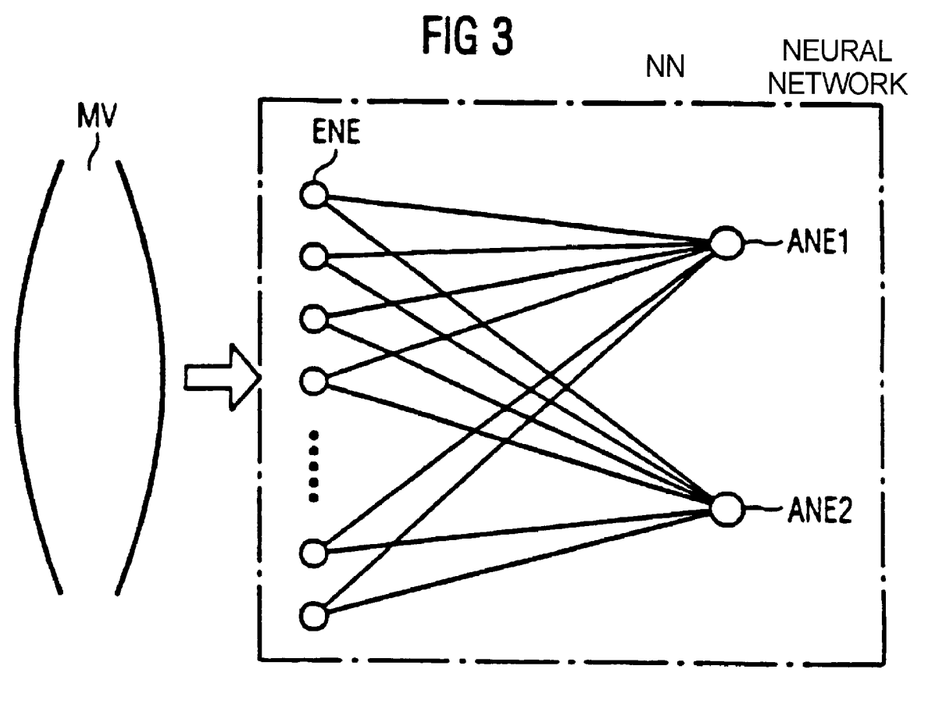
FIG. 3 illustrates a sketch of the neural network upon whose employment the speaker verification can be implemented in a very simple way in a development of the method.

In FIG. 3, a plurality of input neurons ENE of the neural network NN preferably correspond to the plurality of components of the feature vector MV, i.e. to the dimensionality of the feature vector MV. In this simple structure of the neural network NN, two output neurons ANE1, ANE2 are provided for the neural network. A first output neuron ANE1 represents the decision that the speaker SPR is not classified as the speaker to be verified. A second output neuron ANE2 represents the decision that the speaker SPR is classified as the speaker to be verified.

In one version, however, it is provided to use only one output neuron. The output neuron indicates whether the speaker SPR is not classified as the speaker to be verified on the basis of its activation with a first value, for example the value 0, or indicates whether the speaker SPR is classified as the speaker to be verified with a second value, for example the value 1. The plurality of weightings required in the neural network NN is cut in half with this modification.

The comparison in steps or modules 102 and 103 of the feature vector MV to the reference feature vector RMV and to the anti-feature vector GMV upon employment of the neural network NN is implicitly realized in that, in the training phase of the neural network, the neural network NN is trained with the at least one reference feature vector RMV and the anti-feature vector GMV. The weightings of the neural network NN are thereby adapted in such a way that, proceeding from the available training data. I.e. the reference feature vector RMV and the anti-feature vector GMV, an optimally optimum classification is achieved in this 2-class problem.

When the feature vector MV is then supplied to the neural network NN, i.e. when the individual components MV are supplied to the input neurons ENE, the comparison implicitly ensues by weighting the individual couplings of the neural network with the output neurons ANE1 and ANE2 of the neural network. The respective range within which the similarity value AW may respectively deviate from the prescribed value ensues by adaptation of the weightings of the neural network NN in the training phase.

The setting of the range beginning with which a voice signal SPS is viewed as belonging to the speaker to be verified is dependent on the security requirement of the respective application.

With the similarity value AW, which is likewise implicitly contained in the weightings of the neural network given employment of the neural network NN, the similarity, first, of the voice signal SPS or, respectively, of the feature vector MV to the reference voice signal is represented or, respectively, the similarity of the voice signal with the voice anti-signal, i.e. the "non-similarity". This describes the degree of the distinguishability of the feature vector MV or, respectively, of the voice signal SPS and the anti-feature vector GMV or, respectively, the voice anti-signal.

It is also provided in a development of the method that a plurality of reference feature vectors RMV and/or a plurality of anti-feature vectors are taken into consideration in the method.

This means a plurality of speech samples to be taken into consideration that must be spoken either by the speaker to be verified or by at least one other speaker not to be verified.

In order to alleviate the unpleasant task for the user of repeatedly speaking redundant information, i.e. redundant reference voice signals or, voice anti-signals, it is provided in a development of the method to request that the speaker to be verified and/or the other speaker not to be verified merely speak the respective speech sample once, and to subject the respectively spoken voice signal to a time distortion of the respective voice signal SPS, SPSi, for example with the method described in B. Kammerer and W. Kupper, Experiments for Isolated Word Recognition, Single- and Two-Layer-Perceptrons, Neural Networks, Vol. 3, pp. 693–706, 1990, fully incorporated herein by reference, and to thus derive a plurality of reference voice signals and/or voice anti-signals by time distortion from only respectively one spoken speech sample.

It is also advantageous to merely employ individually spoken letters and/or individually spoken numbers as voice signals.

This development of the method makes it possible to accelerate the implementation of the method with the computer R and to considerably reduce the required memory in the computer R.

A realization of the method in very small devices given substantially less outlay can also be realized with this development of the method.

For example, it is thus very advantageous to employ the method for speaker verification for the authentification of an owner of, for example, a telecommunication terminal equipment or of a mobile radiotelephone terminal equipment as well.

Although modifications and changes may be suggested by those skilled in the art, it is the intention of the inventors to embody within the patent warranted hereon all changes and modifications as reasonably and properly come within the scope of their contribution to the art.

What is claimed is:

1. A method for verifying a person on the basis of voice signals using a neural network, the method comprising the steps of:

in a training phase, (A) generating and storing a reference feature vector from training phase voice signal generated by a speaker to be verified, (B) generating and storing an anti-reference feature vector from a voice anti-signal generated by a speaker not to be verified, (C) training the neural network using the reference feature vector and the anti-reference feature vector, thereby adapting weightings of the neural network to permit an optimum classification for a two-class problem;

and in an operating phase, (D) generating a feature vector from an operating phase voice signal generated by an unknown person, who may or may not be the speaker to be verified, (E) submitting the feature vector, the stored reference feature vector and the stored anti-feature vector to the neural network for a only a single comparison between (a) the feature vector and the reference feature vector and only a single comparison between (b) the feature vector and the anti-reference feature vector, wherein said comparisons are capable of being made when said anti-reference feature vector is generated from only one speaker not to be verified, (F) generating only a single operating phase similarity value from only the two comparisons in step (E), and (G) classifying the unknown person as verified when the single operating phase similarity value falls within a predetermined range of values.

2. The method according to claim 1, wherein the neural network comprises a perceptron structure.

3. The method according to claim 1, wherein:

the step of generating and storing a reference feature vector is a step of generating and storing a single reference feature vector; and the step of generating and storing a reference feature vector is a step of generating and storing a single anti-reference feature vector.

4. A method for verifying a person on the basis of voice signals using a neural network, the method comprising the steps of:

in a training phase, (A) generating and storing a reference feature vector from training phase voice signal generated by a speaker to be verified, (B) generating and storing an anti-reference feature vector from a voice anti-signal generated by a speaker not to be verified, (C) training the neural network using the reference feature vector and the anti-reference feature vector, thereby adapting weightings of the neural network to permit an optimum classification for a two-class problem;

and in an operating phase, (D) generating a feature vector from an operating phase voice signal generated by an unknown person, who may or may not be the speaker to be verified, (E) submitting the feature vector, the stored reference feature vector and the stored anti-feature vector to the neural network for a only a single comparison between (a) the feature vector and the reference feature vector and only a single comparison between (b) the feature vector and the anti-reference feature vector, wherein said comparisons are capable of being made when said anti-reference feature vector is generated from only one speaker not to be verified, (F) generating only a single operating phase similarity value from only the two comparisons in step (E), (G) repeating steps D–F for a plurality of operating phase voice signals generated by the unknown person; and (H) classifying the unknown person as verified when the result of a function combining the single operating phase similarity values falls within a predetermined range of values.

5. The method according to claim 4, wherein:

following each iteration of method steps A) through C) in claim 2, a similarity value is formed from respective comparisons between the feature vector and the reference feature vector, and between the feature vector and the anti-feature vector, a similarity of the feature vector to the reference feature vector and a similarity of the feature vector with the anti-feature vector being described by said similarity value;

a new iteration is undertaken when the similarity value deviates by more than a prescribed range from a prescribed value; and the speaker is otherwise not classified as the speaker to be verified.

6. The method as in one of claim 1,4–5 wherein:

at least two reference feature vectors or at least two anti-feature vectors are employed in the method; and the reference feature vectors or anti-feature vectors are formed by time distortion of a voice signal spoken by the speaker to be verified or, respectively, of a voice signal spoken by the speaker not to be verified.

7. The method as in one of claim 1,4–5 wherein individual, spoken letters or individual, spoken numbers are utilized as voice signals for the verification.

8. A telecommunications system in which the following method is undertaken for speaker verification when a voice signal is received from the telecommunications system:

in a training phase, (A) generating and storing a reference feature vector from training phase voice signal generated by a speaker to be verified, (B) generating and storing an anti-reference feature vector from a voice anti-signal generated by a speaker not to be verified, (C) training the neural network using the reference feature vector and the anti-reference feature vector, thereby adapting weightings of the neural network to permit an optimum classification for a two-class problem;

and in an operating phase,
- (D) generating a feature vector from an operating phase voice signal generated by an unknown person, who may or may not be the speaker to be verified,
- (E) submitting the feature vector, the stored reference feature vector and the stored anti-feature vector to the neural network for a only a single comparison between (a) the feature vector and the reference feature vector and only a single comparison between (b) the feature vector and the anti-reference feature vector, wherein said comparisons are capable of being made when said anti-reference feature vector is generated from only one speaker not to be verified,
- (F) generating only a single operating phase similarity value from only the two comparisons in step (E), and
- (G) classifying the unknown person as verified when the single operating phase similarity value falls within a predetermined range of values.

9. A telecommunications system in which the following method is undertaken for speaker verification when a voice signal is received from the telecommunications system:
in a training phase,
- (A) generating and storing a reference feature vector from training phase voice signal generated by a speaker to be verified,
- (B) generating and storing an anti-reference feature vector from a voice anti-signal generated by a speaker not to be verified,
- (C) training the neural network using the reference feature vector and the anti-reference feature vector, thereby adapting weightings of the neural network to permit an optimum classification for a two-class problem;

and in an operating phase,
- (D) generating a feature vector from an operating phase voice signal generated by an unknown person, who may or may not be the speaker to be verified,
- (E) submitting the feature vector, the stored reference feature vector and the stored anti-feature vector to the neural network for a only a single comparison between (a) the feature vector and the reference feature vector and only a single comparison between (b) the feature vector and the anti-reference feature vector, wherein said comparisons are capable of being made when said anti-reference feature vector is generated from only one speaker not to be verified,
- (F) generating only a single operating phase similarity value from only the two comparisons in step (E),
- (G) repeating steps D–F for a plurality of operating phase voice signals generated by the unknown person; and
- (H) classifying the unknown person as verified when the result of a function combining the single operating phase similarity values falls within a predetermined range of values.

10. The method according to claim 9, wherein, following each iteration of the method steps D)–F), a similarity value is formed from the respective comparisons, a similarity of the feature vector to the reference feature vector and a similarity of the feature vector with the anti-feature vector being described by said similarity value, and wherein a new iteration is undertaken when the similarity value deviates by more than a prescribed range from a prescribed value, and wherein the speaker is otherwise not classified as the speaker to be verified.

11. A mobile radiotelephone system in which the following method is undertaken for speaker verification when a voice signal is received from the telecommunications system:
in a training phase,
- (A) generating and storing a reference feature vector from training phase voice signal generated by a speaker to be verified,
- (B) generating and storing an anti-reference feature vector from a voice anti-signal generated by a speaker not to be verified,
- (C) training the neural network using the reference feature vector and the anti-reference feature vector, thereby adapting weightings of the neural network to permit an optimum classification for a two-class problem;

and in an operating phase,
- (D) generating a feature vector from an operating phase voice signal generated by an unknown person, who may or may not be the speaker to be verified,
- (E) submitting the feature vector, the stored reference feature vector and the stored anti-feature vector to the neural network for a only a single comparison between (a) the feature vector and the reference feature vector and only a single comparison between (b) the feature vector and the anti-reference feature vector, wherein said comparisons are capable of being made when said anti-reference feature vector is generated from only one speaker not to be verified,
- (F) generating only a single operating phase similarity value from only the two comparisons in step (E), and
- (G) classifying the unknown person as verified when the single operating phase similarity value falls within a predetermined range of values.

12. A mobile radiotelephone system in which the following method is undertaken for speaker verification when a voice signal is received from the telecommunications system:
in a training phase,
- (A) generating and storing a reference feature vector from training phase voice signal generated by a speaker to be verified,
- (B) generating and storing an anti-reference feature vector from a voice anti-signal generated by a speaker not to be verified,
- (C) training the neural network using the reference feature vector and the anti-reference feature vector, thereby adapting weightings of the neural network to permit an optimum classification for a two-class problem;

and in an operating phase,
- (D) generating a feature vector from an operating phase voice signal generated by an unknown person, who may or may not be the speaker to be verified,
- (E) submitting the feature vector, the stored reference feature vector and the stored anti-feature vector to the neural network for a only a single comparison between (a) the feature vector and the reference feature vector and only a single comparison between (b) the feature vector and the anti-reference feature vector, wherein said comparisons are capable of being made when said anti-reference feature vector is generated from only one speaker not to be verified,
- (F) generating only a single operating phase similarity value from only the two comparisons in step (E),
- (G) repeating steps D–F for a plurality of operating phase voice signals generated by the unknown person; and
- (H) classifying the unknown person as verified when the result of a function combining the single operating phase similarity values falls within a predetermined range of values.

13. The method according to claim 12, wherein:
following each iteration of method steps (A) through (C) in claim 12, a similarity value is formed from respective comparisons between the feature vector and the reference feature vector, and between the feature vector and the anti-feature vector, a similarity of the feature vector to the reference feature vector and a similarity of the feature vector with the anti-feature vector being described by said similarity value;

a new iteration is undertaken when the similarity value deviates by more than a prescribed range from a prescribed value; and the speaker is otherwise not classified as the speaker to be verified.

* * * * *